United States Patent [19]

Harada et al.

[11] Patent Number: 5,234,647

[45] Date of Patent: Aug. 10, 1993

[54] METHOD OF MANUFACTURING RUBBER SHEET WITH RUGGED PATTERNS FORMED ON ITS ONE SIDE SURFACE PORTION

[75] Inventors: Shigeaki Harada, Yokohama; Shigeru Miyazaki; Noriyuki Iwanaga, both of Kodaira, all of Japan

[73] Assignee: Bridgestone Corporation, Tokyo, Japan

[21] Appl. No.: 825,086

[22] Filed: Jan. 24, 1992

[30] Foreign Application Priority Data

Feb. 1, 1991 [JP] Japan .................... 3-011841

[51] Int. Cl.$^5$ .................................. B29C 47/32
[52] U.S. Cl. .................. 264/167; 264/175; 264/177.1; 264/349; 425/194; 425/201; 425/327; 425/374; 425/381
[58] Field of Search ........... 425/327, 374, 382.3, 425/381, 200, 201, 186, 190, 194; 264/175, 349, 177.1, 167, 177.17, 210.1; 366/77, 69

[56] References Cited

U.S. PATENT DOCUMENTS

| | | | |
|---|---|---|---|
| 2,842,796 | 7/1958 | Rhodes | 425/374 |
| 2,892,212 | 6/1959 | Rhodes | 425/327 |
| 2,976,565 | 3/1961 | Gyana | 264/175 |
| 3,143,155 | 8/1964 | Knox | 152/330 |
| 3,871,810 | 3/1975 | Geyer | 425/374 |
| 4,576,563 | 3/1986 | Harada et al. | 425/382.3 |
| 4,732,551 | 3/1988 | East et al. | 425/382.4 |
| 5,030,079 | 7/1991 | Benzing, II | 425/374 |

*Primary Examiner*—Jeffery Thurlow
*Assistant Examiner*—Mathieu Vargot
*Attorney, Agent, or Firm*—Lane, Aitken & McCann

[57] ABSTRACT

A method of manufacturing a rubber sheet with rugged patterns formed on one side surface portion includes the step of preparing an apparatus including a rotating roll having rugged patterns, a member having an arcuate inner surface radially spaced apart from an outer peripheral surface of the rotating roll, and a die. The arcuate inner surface is recessed away from the rotating roll and defines an arcuate compartment chamber together with the outer peripheral surface of the rotating roll. The arcuate compartment chamber, has an inlet port and an outlet port. The die is placed in such a manner to adjoin to the outlet port portion of the compartment chamber, the die having an inner edge portion which is radially spaced apart from the outer peripheral surface of the rotating roll and defines an extrusive clearance together with the outer peripheral surface. The method further includes the steps of feeding a feed rubber into the arcuate compartment chamber through the inlet port thereof, kneading the feed rubber in the compartment chamber and moving the feed rubber from the inlet port toward the outlet port, and extruding the rubber sheet made of the feed rubber from the compartment chamber through the extrusive clearance.

6 Claims, 4 Drawing Sheets

METHOD OF MANUFACTURING RUBBER SHEET WITH RUGGED PATTERNS FORMED ON ITS ONE SIDE SURFACE PORTION

FIELD OF THE INVENTION

The present invention relates to a method of manufacturing a rubber sheet with rugged patterns formed on its one side surface portion and, more particularly, to a method of manufacturing a rubber sheet used for a tire manufactured by vulcanizing a green tire constituted by laminated rubber sheets.

DESCRIPTION OF THE PRIOR ART

In a general manufacturing process of a tire, a plurality of nonvulcanized rubber sheets having tackiness or tacky surfaces and having wide breaths are used. The nonvulcanized rubber sheets include an inner liner made of a nonvulcanized rubber, a cord coated with a nonvulcanized rubber. These rubber sheets and tread compound rubber are applied to an outer peripheral surface of a cylindrical drum for example in above described order and adhered to each other under pressure to form a so-called green case or green tire. Then, the green case or the green tire is vulcanized. In the forming process of the green case or the green tire, after the nonvulcanized rubber sheets are applied to the drum and laminated each other, the laminated rubber sheets are adhered to each other by a stitching roll, etc. If both surfaces of the rubber sheets are even, air remains between the adhesive rubber sheets adjoining to each other during the vulcanizing process, thereby causing air pockets or cavities in the finished tire. Furthermore, air between an air bag and the inner peripheral surface of the green tire is not perfectly removed during the vulcanizing process so that marks of the residual air are borne on the inner surface of the green tire after the vulcanizing process. The air pockets, the cavities and the borne marks may result in troubles at the time when a vehicle runs, and make the undesirable appearance of the tire. For the purpose of resolving the foregoing problems, recently, rugged patterns are formed on the one side surface portion of the rubber sheet. The rugged patterns are constituted by elongated protrusions transverse from one end of the rubber sheet to the other end thereof, the protrusions allowing an escape of entrapped air between the rubber sheet and an adjacent object.

As an example of a conventional method of manufacturing a rubber sheet with rugged patterns formed on its one side surface, there is proposed a method applied to an apparatus comprising a calender 1 and a patterning former 2 as shown in FIG. 4. The calender 1 comprises an upper roll 3A and a lower roll 3B which are rotated by motors (not shown). A heated raw rubber, i.e., a warmed up raw rubber 4 is fed to the calender 1 and allowed to pass through a clearance between the upper roll 3A and the lower roll 3B so that a rubber sheet 5 made of the raw rubber 4 is extruded from the calender 1. Then, the rubber sheet 5 is conveyed from the calender 1 to the patterning former 2 by a conveyor belt 6. The patterning former 2 comprises a smooth roll 8 and a ridge roll 7 having elongated grooves formed on its outer peripheral surface portion. The conveyed rubber sheet 5 is fed to the patterning former 2 and allowed to pass through a clearance between the ridge roll 7 and the smooth roll 8 so that a rugged rubber sheet 9 made of the rubber sheet 5 is extruded from the patterning former 2. During the rubber sheet 5 passes through the clearance between the ridge roll 7 and the smooth roll 8, the groove patterns of the ridge roll 7 are transferred to one side surface portion of the rubber sheet 5. Therefore, the rugged rubber sheet 9 has protrusion patterns as rugged patterns formed on its one side surface portion.

In addition, as an example of an additional conventional method of manufacturing a rubber sheet with rugged patterns formed on its one side surface portion, there is proposed another method applied to an apparatus disclosed in Japanese Utility Model Gazette No. 62-15912. This apparatus is provided with a calender 11 comprising a top roll 12, a center roll 13 and a bottom roll 14 aligned on a vertical plane as shown in FIG. 5. The outer peripheral surface portion of the bottom roll 14 has rugged patterns 14A. A rubber lamina 16 is formed as a cement on the outer peripheral surface of the center roll 13 and conveyed thorough a clearance between the center roll 13 and the bottom roll 14. On the other hand, a cord fabric 15 is fed to the calender 11 and allowed to pass through the clearance between the center roll 13 and the bottom roll 14. While the cord fabric 15 and the rubber lamina 16 pass through the clearance between the center roll 13 and the bottom roll 14, the rubber lamina 16 is sunk into stitches of the cord fabric 15 and coated on the cord fabric 15 by the frictional force between the center roll 13 and the bottom roll 14. At the same time, the rugged patterns 14A are transferred to one side surface portion of the cord fabric 15 coated with the rubber so that a coated cord 17 with rugged patterns is extruded through the clearance between the center roll 13 and the bottom roll 14.

In the conventional apparatus shown in FIG. 4, however, there are encountered difficulties that it is necessary to regulate the clearance between the ridge roll 7 and the smooth roll 8 of the patterning former 2 if the thickness of the rubber sheet 5 extruded from the calender 1 is changed. Even if, on the contrary, the thickness of the rubber sheet 5 is always fixed, the heights of the protrusions formed on the surface portion of the rugged rubber sheet 9 is varied in response to the speed change of the conveyor belt 6. It is thus necessary that a pressure applied to the smooth roll 8 by the ridge roll 7 should be regulated in response to the speed change of the conveyor belt 6 for preventing the height of the protrusions from being varied. In addition, a distance between the calender 1 and the patterning former 2 is so long that the rubber sheet 5 is cooled and hardened during the conveyance of the rubber sheet 5 by the conveyor belt 6. Therefore, the pliability of the rubber sheet 5 is reduced, thereby causing a difficulty in transferring the groove patterns to the rubber sheet 5.

If, furthermore, one side surface of the rubber sheet 5 is undulated, i.e., the rubber sheet 5 is a so-called contour rubber sheet, it is impossible to transfer the groove patterns to the rubber sheet 5 throughout the sheet width. That is to say, in the conventional method of the rubber sheet with the rugged patterns, it is difficult to uniformly maintain the contact conditions between ridge roll 7 and the rubber sheet 5 during the patterning process. The contact conditions includes the pressure applied to the rubber sheet 5 by the ridge roll 7, the time to apply the pressure, the pliability of the rubber sheet 5 and the like. It is also necessary to operate many adjustments at the start of the patterning process, thereby making it difficult to determine the conditions of the patterning process.

In the conventional apparatus shown in FIG. 5, the rugged patterns 14A of the bottom roll 14 apply the frictional force to the cord fabric 15 and force the rubber lamina 16 previously formed for cementing to be sunk into the cord fabric 15. At the same time, the rugged patterns 14A are transferred to the one side surface portion of the cord fabric 15 coated with the rubber. In the case where the rubber sheet 16 having an undulated surface, i.e., the so-called contour rubber sheet 16 is manufactured, it is necessary to replace the center roll 13 with a roll having an undulated peripheral surface, i.e., a so-called contour roll. Furthermore, every change of the tire size makes necessary the replacement of the contour roll, thereby requiring a long time and much labor for the replacement and causing a difficulty in operating the replacement.

The present invention, which is summarized and described in detail below, contemplates resolution of the foregoing problems encountered in prior-art methods of manufacturing a rubber sheet with rugged patterns.

SUMMARY OF THE INVENTION

In accordance with another important aspect of the present invention, there is a method of manufacturing a rubber sheet with rugged patterns formed on its one side surface portion, comprising the steps of: preparing an apparatus comprising a rotating roll having rugged patterns formed on its outer peripheral surface portion, a member positioned in the vicinity of the rotating roll and having an arcuate inner surface radially spaced apart from an outer peripheral surface of the rotating roll, the arcuate inner surface being recessed away from the rotating roll and defining an arcuate compartment chamber together with the outer peripheral surface of the rotating roll, the arcuate compartment chamber having an inlet port and an outlet port spaced apart from each other in a rotational direction of the rotating roll, and a die placed in such a manner to adjoin to the outlet port portion of the compartment chamber and having an inner edge portion which is radially spaced apart from the outer peripheral surface of the rotating roll and defines an extrusive clearance together with the outer peripheral surface; feeding a feed rubber into the arcuate compartment chamber through the inlet port thereof; kneading the feed rubber in the compartment chamber and moving the feed rubber from the inlet port toward the outlet port; and extruding the rubber sheet made of the feed rubber from the compartment chamber through the extrusive clearance, characterized that as soon as the rubber sheet is extruded from the extrusive clearance, the rugged patterns are formed on one side surface portion of the rubber sheet facing to the outer peripheral surface of the rotating roll.

BRIEF DESCRIPTION OF THE DRAWINGS

The features and advantages of the present invention will be more clearly understood from the following description taken in conjunction with the accompanying drawings in which.

DESCRIPTION OF THE PREFERRED EMBODIMENTS

A preferred embodiment of an apparatus for manufacturing a rubber sheet with rugged patterns formed on its one side surface portion according to the present invention will be hereinafter described with reference to FIGS. 1 to 3 of the drawings.

Firstly, the constitution of the apparatus shown in FIGS. 1 and 2 will be explained. A rotating roll type extruder 21 illustrated in FIG. 1 is modified on the basis of Japanese Patent Application No. 58-239682 disclosing a rotating roll 22 having rugged patterns formed on its outer peripheral surface portion. The rotating roll type extruder 21 comprises the rotating roll 22 rotatably supported by a side panel 21A of the extruder 21 in such a manner as to have a substantially horizontal axis, and a smooth roll 23 rotatably placed above and in parallel relationship with the rotating roll 22.

Figure 1:
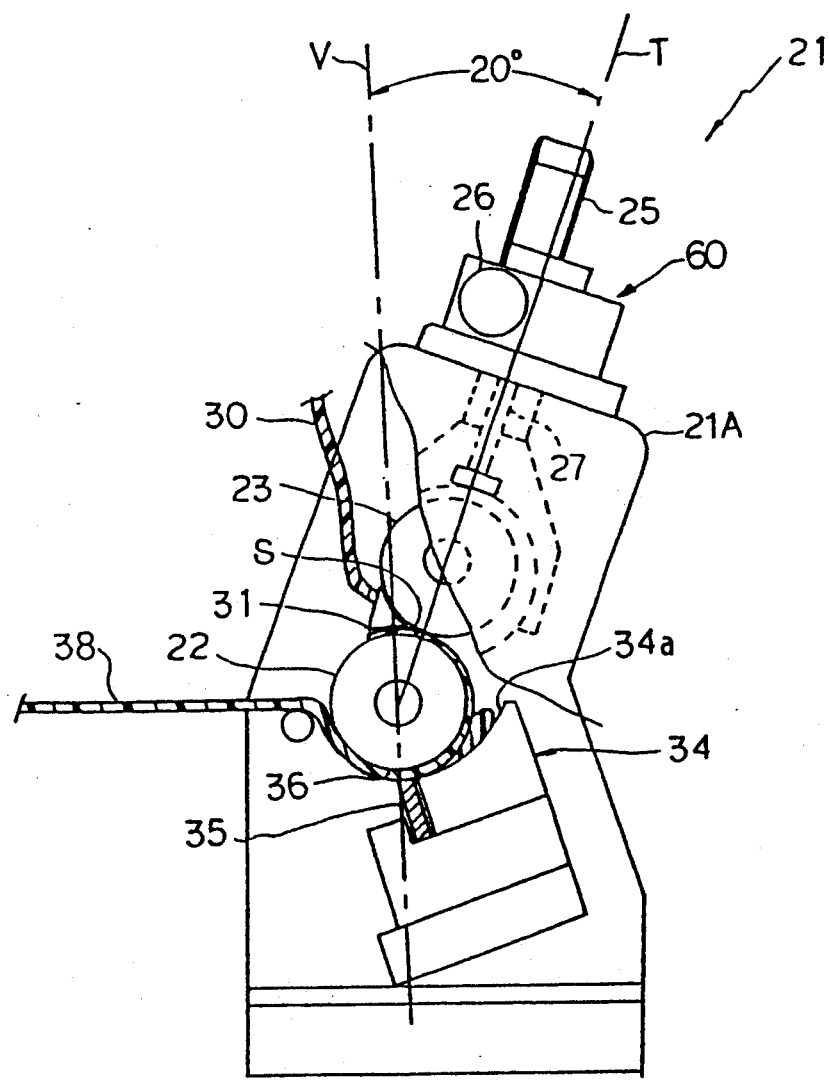
FIG. 1 is a schematic side elevation view showing a preferred embodiment of an apparatus for manufacturing a rubber sheet with rugged patterns according to the present invention.
Figure 2A:
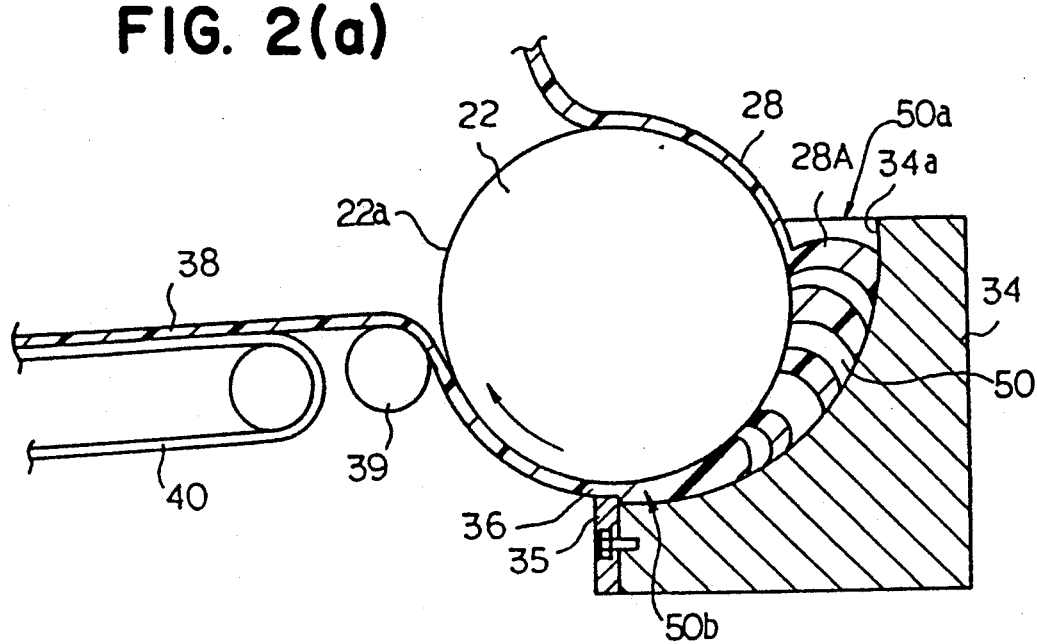
FIG. 2(a) is a fragmentary vertical sectional view showing, to an enlarged scale, the apparatus illustrated in FIG. 1.

As shown in FIG. 1, the smooth roll 23 is positioned on a plane T passing through the axis of the rotating roll 22 and inclined from the vertical line V by 20°. In addition, it is possible to regulate a feed clearance S between the rotating roll 22 and the smooth roll 23. The rotating roll 22 is rotated by a motor (not shown) in a direction of arrow described in FIG.2 (a), and is 400 mm and 950 mm in diameter $D_{22}$ and axial length $M_{22}$, respectively.

Figure 2B:
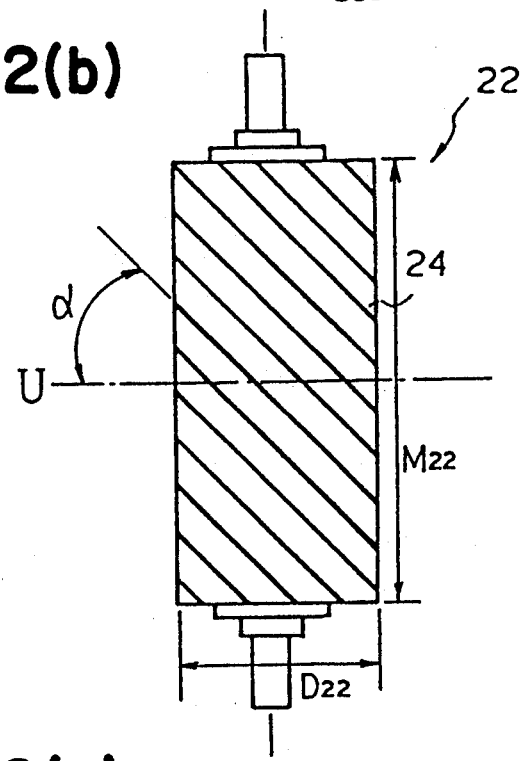
FIG.2 (b) is a plan view showing a rotating roll of the apparatus illustrated in FIG. 1.
FIG. 2(c) is a fragmentary sectional view showing, to an enlarged scale, a peripheral surface portion of the rotating roll illustrated in FIG. 2(b)
Figure 2C:
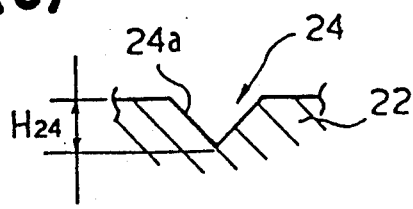
Figure 3:
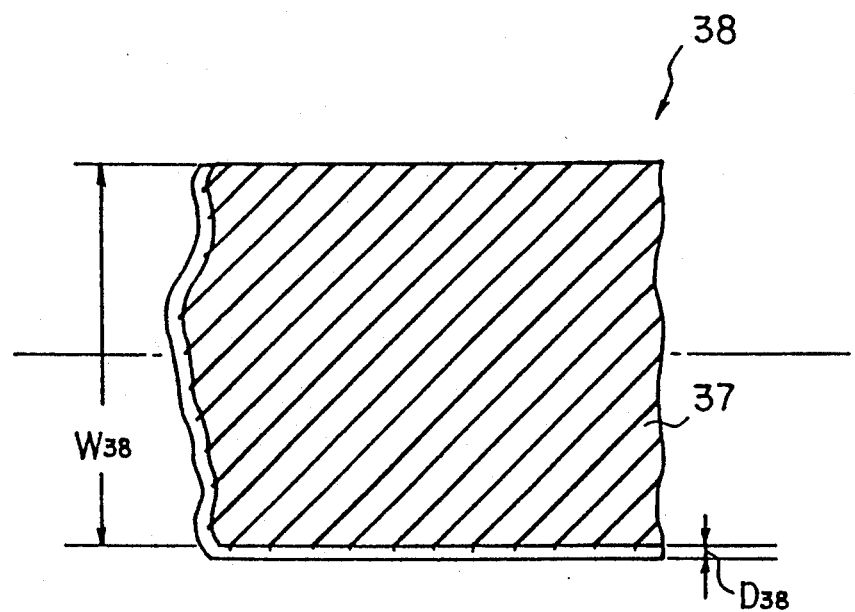
FIG. 3 is a fragmentary perspective view showing a rubber sheet with rugged patterns formed on its one side surface portion, which is manufactured by the apparatus illustrated in FIG. 1.
Figure 4:
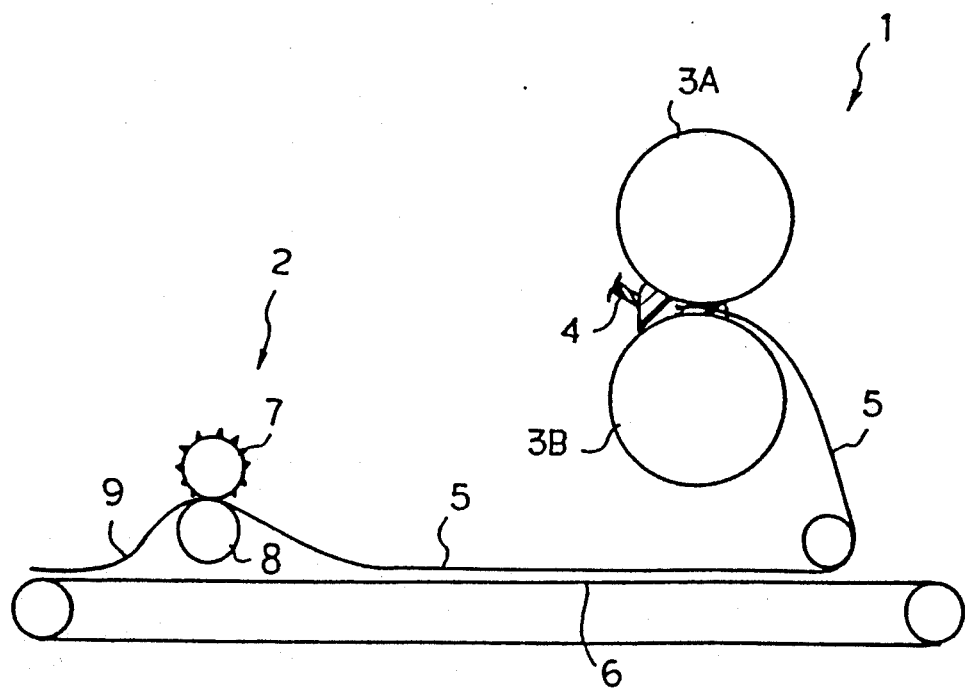
FIG. 4 is a schematic side elevation view showing a first example of a prior-art apparatus for manufacturing a rubber sheet with rugged patterns formed on its one side surface portion.
Figure 5:
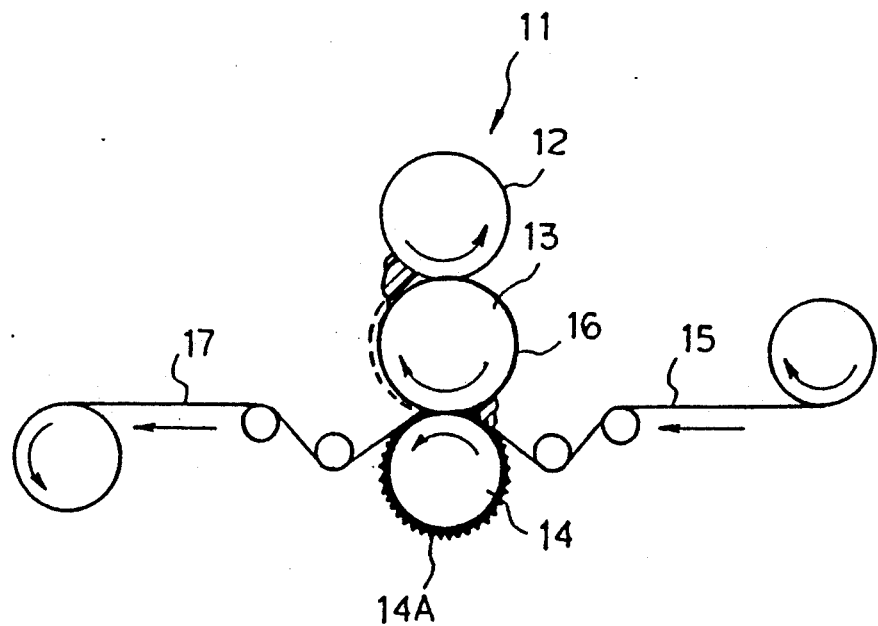
FIG. 5 is a schematic side elevation view showing a second example of a prior-art apparatus for manufacturing a rubber sheet with rugged patterns formed on its one side surface portion.

As shown in FIGS. 2(b) and 2(c), helical elongated narrow grooves 24 parallel to each other and making rugged patterns are formed on an outer peripheral surface portion of the rotating roll 22. The narrow grooves traverse the rotating roll from one axial end to the other axial end. In addition, the axis of the grooves and the tangent U perpendicular to the rotating axis of the rotating roll 22 intersect at an angle $\alpha$ of for example 45° as will be seen from FIG. 2(b). FIG. 2(c) shows a radial fragmentary cross-section of the outer peripheral surface portion of the rotating roll 22. As shown in FIG. 2(c), the narrow grooves 24 have depths $H_{24}$ of 0.1 to 0.5 mm (0.5 mm in this embodiment) and are V-shaped, e.g., have both inner side surfaces 24a perpendicular to each other in the embodiment. The narrow grooves 24 are formed by etching process after the outer peripheral surface of the rotating roll 22 is polished. Then, the etched peripheral surface of the rotating roll 22 is plated by chrome of which the thickness is 0.03 mm.

The smooth roll 23 has a diameter of 400 mm and an axial length of 950 mm like the rotating roll 22, and is rotated independently of the rotating roll 22 by a motor (not shown). The peripheral speed ratio of the rotating roll 22 to the smooth roll 23 is 1 to 0.818, namely, the peripheral speed of the rotating roll 22 is higher than that of the smooth roll 23.

A reduction gear 26 drivably connected to motors 25 is provided above the smooth roll 23 in such a way as to be positioned on the inclined plane T and connected to a pressure shaft 27 which is connected to bearings of the smooth roll 23. The smooth roll 23 is controllably moved on the inclined plane T by the motor 25 through the reduction gear 26 and the pressure shaft 27, thereby regulating the feed clearance S between the rotating roll 22 and the smooth roll 23. The motor 25, the reduction gear 26 and the pressure shaft 27 collectively define regulating means 60 for regulating the feed clearance S between the rotating roll 22 and the smooth roll 23. The regulation of the clearance S makes it possible to control a feed thickness g of a feed rubber 28 which is fed to a compartment chamber 50 described below through an inlet port 50a thereof.

A reference numeral 30 indicates a belt-shaped rubber material which is heated, i.e., warmed up by a warming up roll (not shown) and fed to the extruder 21 and allowed to pass through the feed clearance S between the rotating roll 22 and the smooth roll 23. A reference numeral 31 defines a stock guide plate placed between the rotating roll 22 and the smooth roll 23 and allowing the rubber material 30 to be guided to the feed clearance S between the rotating roll 22 and the smooth roll 23 so that the feed width of the feed rubber 28 extruded through the feed clearance S can be regulated to a predetermined level. Therefore, the feed rubber 28 is able to have a preferred thickness and a width in response to a thickness and a width of a rubber sheet 38 extruded from the extruder 21 as described below so that the feed volume of the feed rubber 28 can be preferably controlled.

A member 34 is placed in the vicinity of the rotating roll 22 in such a manner as to oppose to the stock guide plate 31 through the rotating roll 22, and has an arcuate inner surface 34a radially spaced apart from the outer peripheral surface 22a of the rotating roller 22. The arcuate inner surface 34a is recessed away from the rotating roller 22 and defines an arcuate compartment chamber 50 together with the outer peripheral surface 22a. The arcuate compartment chamber 50 has an inlet port 50a and an outlet port 50b spaced apart from each other in a rotational direction of the rotating roll 22. Furthermore, the arcuate compartment chamber 50 has a radial dimension gradually becoming smaller from the inlet port 50a toward the outlet port 50b. In other words, the distance between the outer peripheral surface 22a and the arcuate inner surface 34a gradually becomes smaller from the inlet port 50a toward the outlet port 50b. A die 35 is detachably attached to the member 34 in such a manner as to adjoin to the outlet port portion of the compartment chamber 50 and has an inner edge portion. The inner edge portion is radially spaced apart from the outer peripheral surface 22a of the rotating roll 22 and defines an extrusive clearance 36 together with the outer peripheral surface 22a. In addition, the inner edge portion of the die 35 is movable toward and away from the outer peripheral surface 22a of the rotating roll 22 so as to allow the extrusive clearance 36 to be controllable. On the other hand, the exchange of the die 35 makes it possible to change the dimension and the shape of the extrusive clearance 36, thereby making it possible to defining the extrusive clearances having various dimensions and shapes. If, for example, a die having an inner surface facing to the outer peripheral surface 22a is undulated, i.e., a so-called contour die is used, the extrusive clearance 36 has an undulated portion.

If the feed rubber 28 is fed into the arcuate compartment chamber 50 through the inlet port 50a thereof, the feed rubber 28 is moved toward the outlet port 50b thereof by the rotating roll 22, and then a rubber sheet 38 made of the feed rubber 28 and having a moderate high temperature is extruded from the arcuate compartment chamber 50 through the extrusive clearance 36. While the feed rubber 28 passes through the extrusive clearance 36, the elongated narrow grooves 24 are transferred to the feed rubber 28, thereby forming elongated narrow protrusions 37 on one side surface portion of the feed rubber 28. That is to say, the groove patterns as the rugged patterns of the rotating roll 22 are transferred to one side surface portion of the feed rubber 28 so that the rubber sheet 38 having the protrusion patterns as the rugged patterns formed on its one side surface portion is extruded from the extruder 21. The extruded rubber sheet 38 is guided to a conveyor belt 40 by a drawing-out roll 39 placed in the vicinity of the rotating roll 22. The rubber sheet 38 is 3.2 mm and 760 mm in thickness $D_{38}$ and width $W_{38}$, respectively. The thickness $D_{38}$ and the width $W_{38}$ of the rubber sheet 38 are able to be changed by the positional regulation of the die 35. On the other hand, the shape of the rubber sheet 38 is able to be changed by the exchange of the die 35. It goes without saying that the rotating roll 22 may be exchanged for a smooth roll or a roll having an undulated outer peripheral surface, i.e., a so-called contour roll. Accordingly, it is possible to change the thickness $D_{38}$, the width $W_{38}$ and the cross sectional shape of the rubber sheet 38 if necessary.

In the manufacture of the rubber sheet 38 with the rugged patterns formed on its one side surface portion, firstly, the warmed up rubber material 30 is fed to the extruder 21 and allowed to pass through the feed clearance S between the rotating roll 22 and the smooth roll 23. Then, the feed width and the feed thickness of the rubber material 30 are controlled by the stock guide plate 31, the rotating roll 22 and the smooth roll 23, thereby feeding the feed rubber 28 having the preferred thickness and width into the compartment chamber 50 through the inlet port 50a thereof. The feed rubber 28 is kneaded together with the remaining rubber 28A in the arcuate compartment chamber 50, pressed and moved toward the outlet port 50b of the arcuate compartment chamber 50 by the rotating roll 22. While the feed rubber 28 passes through the extrusive clearance 36, the feed rubber 28 is kept at a moderate high temperature. At the same time, the narrow grooves 24 are transferred to the one side surface portion of the feed rubber sheet 28 so that the rubber sheet 38 with the protrusions 37 formed on its one side surface portion is extruded from the arcuate compartment chamber 50 through the extrusive clearance 36 by the rotation of the rotating roll 22.

In accordance with the present invention, the feed rubber 28 fed into the compartment chamber 50 clings on the peripheral surface of the rotating roll 22, is kneaded and pressed together with the remaining rubber 28A in the compartment chamber 50 by the rotation of the rotating roll 22, and is moved to the extrusive clearance 36 adjoining to the outlet port 50b of the compartment chamber 50, i.e., the feed rubber 28 is moderately kneaded, pressed and moved toward the extrusive clearance 36 under continual uniform conditions. Accordingly, it is possible to prevent the feed rubber 28 from being cooled and to regularly extrude the rubber sheet 38 of a moderate high temperature.

In addition, not only the rubber sheet 38 shaped like a sheet is stationarily extruded from the extruding clearance 36, but also the narrow protrusions 37 in response to the narrow grooves 24 are formed on the one side surface portion of the rubber sheet 38 as soon as the rubber in the chamber 50 is extruded and forms the sheet 38. Therefore, it is entirely unnecessary to conventionally determine and regulate the contact conditions between a ridge roll and a rubber sheet. The temperature of the rubber sheet 38 is so moderately high that the grooves 24 can be easily transferred to the rubber sheet 38, thereby making it possible to continually and uniformly keep the height and the shape of the protrusions 37 throughout the width of the rubber sheet 38 and to manufacture the rubber sheet 38 having the invariable and stable rugged patterns.

On the other hand, since the extrusive clearance 36 is defined by the rotating roll 22 and the die 35, the structure of the extruder 21 can be simple, namely, an apparatus for preparing a nonpatterned rubber sheet and an apparatus for forming patterns on one side surface portion of the sheet can be incorporated, so that the manufacturing process can be simple.

In addition, it is possible to regulate the position of the die 35 or exchange the die 35, thereby making it possible to control the thickness $D_{38}$ and the width $W_{38}$ of the rubber sheet 38, or the cross sectional profile, i.e., the so-called contour of the rubber sheet 38. If necessary, the rotating roll 22 may be exchanged for the so-called contour roll.

In the meantime, a tire of 1000R20 size for a truck or a bus has been manufactured by a conventional manufacturing method from the rubber sheet 38 with the protrusions 37 manufactured by the method described hereinbefore. Then, it has inspected whether air remained between inner liners and between a inner liner and a ply or not. The inspective result has indicated that air didn't entirely remain there. Therefore, it has been confirmed that the present invention completely prevented inferior tires from being manufactured.

What we claim is:

1. A method of manufacturing a rubber sheet with protrusions formed on its one side surface portion, comprising the steps of:

preparing an apparatus comprising a rotating roll having axial ends and elongated narrow grooves formed on its outer peripheral surface portion, said elongated narrow grooves traversing said rotating roll from one axial end of said rotating roll to the other axial end, a member positioned in the vicinity of said rotating roll and having an arcuate inner surface radially spaced apart from an outer peripheral surface of said rotating roll, said arcuate inner surface being recessed away from said rotating roll and defining an arcuate compartment chamber together with said outer peripheral surface of said rotating roll, said arcuate compartment chamber having an inlet port and an outlet port spaced apart from each other in a rotational direction of said rotating roll, and a die placed in such a manner to adjoin to said outlet port portion of said compartment chamber and having an inner edge portion which is radially spaced apart from said outer peripheral surface of said rotating roll and defines an extrusive clearance together with said outer peripheral surface;

feeding a feed rubber into said arcuate compartment chamber through said inlet port thereof;

kneading said feed rubber in said compartment chamber and moving said feed rubber from said inlet port toward said outlet port; and extruding said feed rubber from said compartment chamber through said extrusive clearance to form said rubber sheet with said protrusions formed on one side surface portion thereof facing to said outer peripheral surface of said rotating roll, said protrusions allowing an escape of entrapped air between said rubber sheet and an adjacent object.

2. A method set forth in claim 1, in which said arcuate compartment chamber has a radial dimension gradually becoming smaller from said inlet port toward said outlet port.

3. A method set forth in claim 1, in which said inner edge portion of said die has an undulated inner surface facing to said outer peripheral surface of said rotating roll.

4. A method set forth in claim 1, in which said die is detachably attached to said member.

5. A method as set forth in claim 1, in which said elongated narrow grooves are parallel to each other.

6. A method set forth in claim 5, in which said elongated narrow grooves are V-shaped.

* * * * *